Oct. 3, 1950
W. A. HYLAND ET AL
DISCONNECTIBLE ACREAGE MEASURING
DEVICE FOR GRAIN DRILLS
2,524,385
Filed Jan. 18, 1946
2 Sheets-Sheet 1
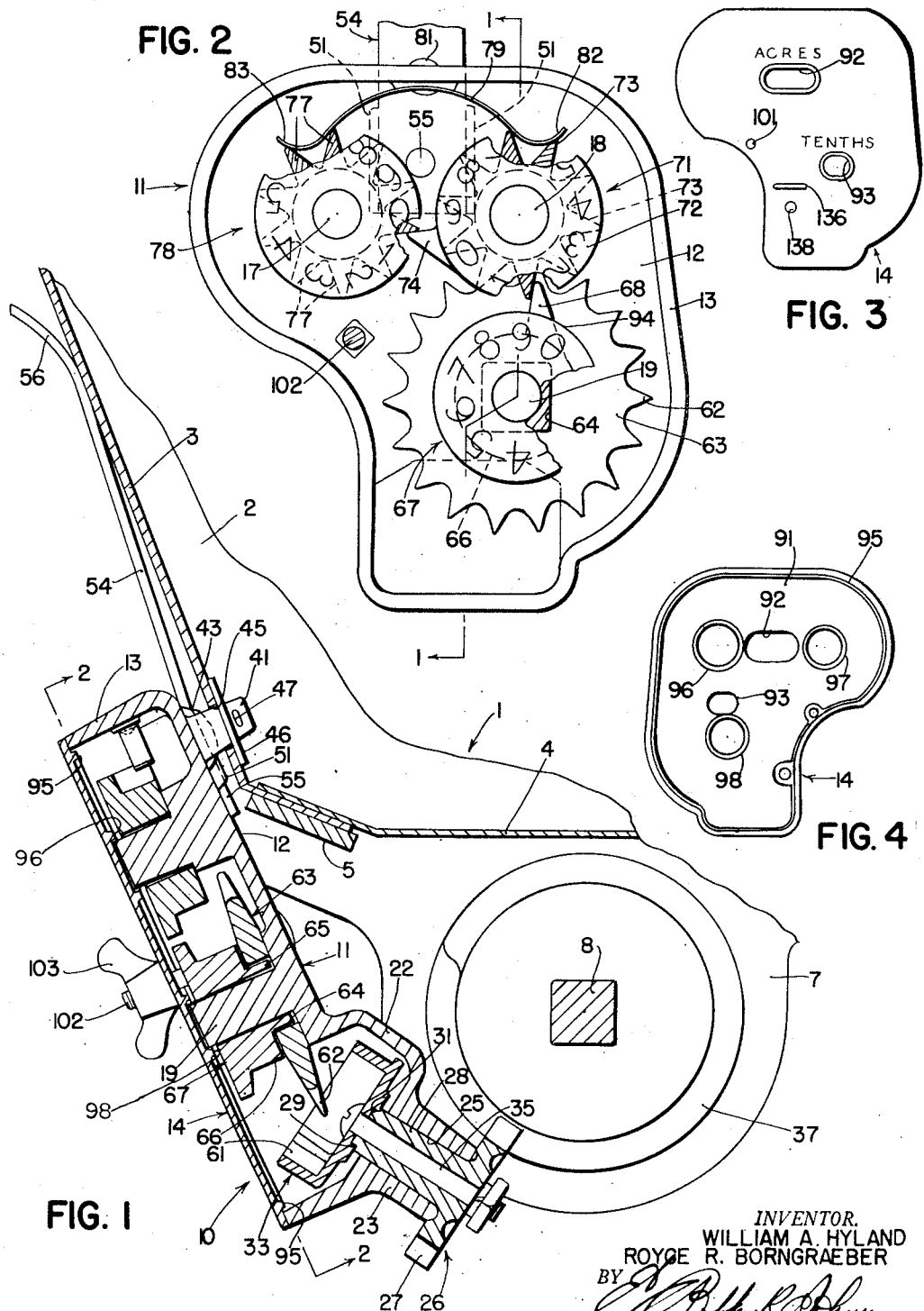
INVENTOR.
WILLIAM A. HYLAND
ROYCE R. BORNGRAEBER
BY
ATTORNEYS.

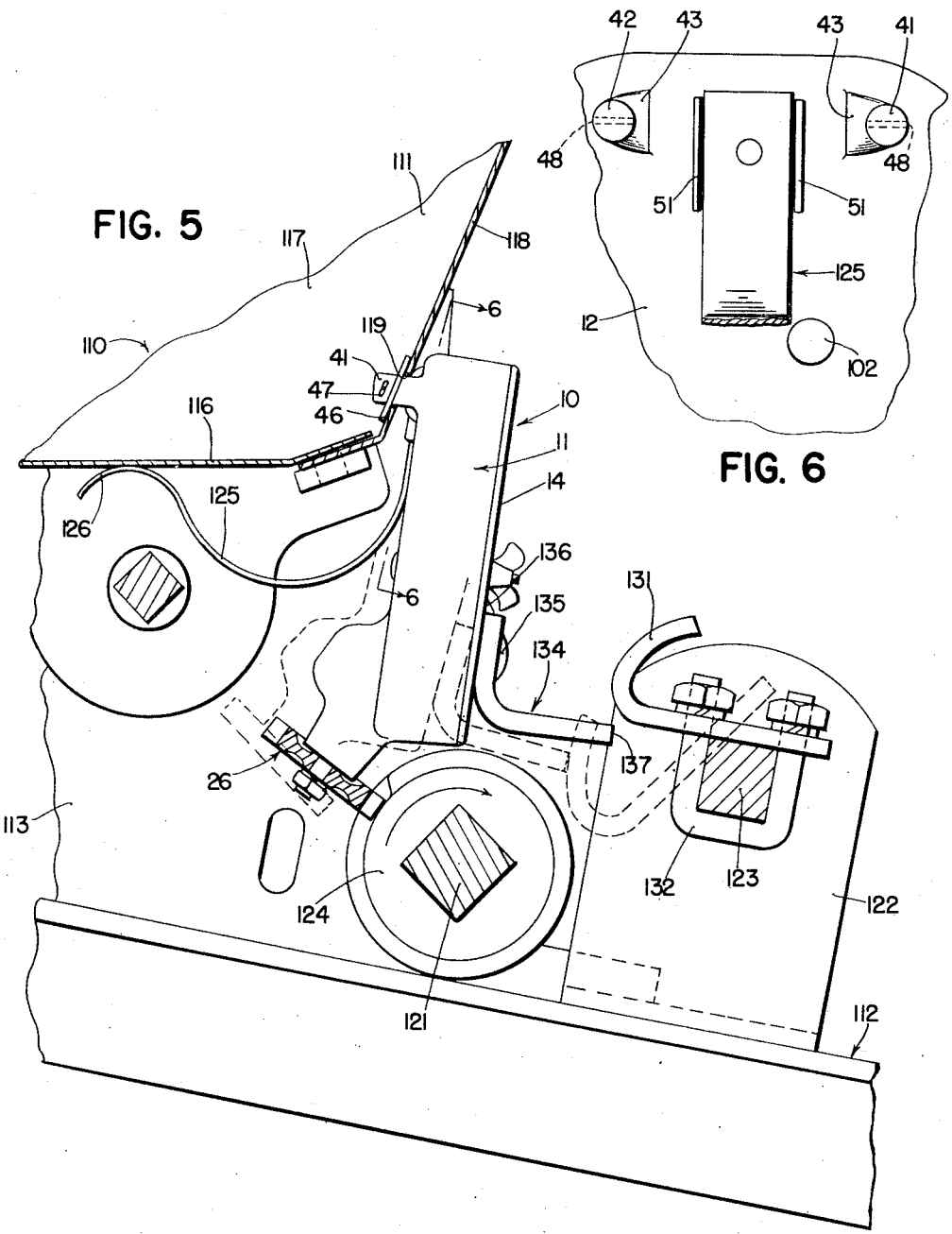

Patented Oct. 3, 1950

2,524,385

UNITED STATES PATENT OFFICE 2,524,385

DISCONNECTIBLE ACREAGE MEASURING DEVICE FOR GRAIN DRILLS

William A. Hyland and Royce R. Borngraeber, Horicon, Wis., assignors to John Deere Van Brunt Company, a corporation of Wisconsin Application January 18, 1946, Serial No. 642,082

7 Claims. (Cl. 235—95)

The present invention relates generally to agricultural implements and more particularly to planting implements, such as grain drills or the like.

The object and general nature of the present invention is the provision of a new and improved land measuring device particularly adapted for farm implements, such as grain drills or the like, in which an indication is given of the number of acres traversed by the implement. For instance, it is especially desirable when drilling wheat or other seed to know the acres covered, and this is provided for by the instant invention.

More particularly, it is a feature of this invention to provide a simple and sturdy construction, embodying only a relatively few parts, so constructed and arranged that the assembly of the land measurer during manufacture involves only a few operations, consisting mainly in merely bringing parts into the correct position, without requiring an excessive number of fastenings or other hinges or difficult to assemble parts. Specifically, one feature of the present invention is the provision of a land measurer having acre wheels mounted on studs in a casing, with the cover for the casing particularly constructed to hold the wheels in place merely by fastening the cover on the casing. It is another feature of this invention to provide a new and simplified construction for mounting the land measurer directly onto the seed box of a grain drill or the like, which mounting means involves only a few parts easily and inexpensively manufactured and assembled. It is an additional feature of this invention to provide a spring carried directly by the land measurer casing and reacting against the seed box tending to hold the land measurer in operative relation with respect to a part on the grain drill which is operated proportionately to the amount or distance traveled by the implement in operation.

These and other objects and advantages of the present invention will be apparent to those skilled in the art after a consideration of the following detailed description, taken in conjunction with the accompanying drawings in which the preferred forms of the present invention have been illustrated.

In the drawings:

Figure 1 is a generally vertical section taken through a land measurer for a grain drill, in which the principles of the present invention have been incorporated.

Figure 2 is a view taken generally along the line 2—2 of Figure 1, with the cover of the land measurer case removed.

Figure 3 is a front view of the cover.

Figure 4 is a back or inside view of the cover.

Figure 5 is a view similar to Figure 1, showing a modified form of the present invention wherein the land measurer is supported in a slightly different way.

Figure 6 is a view taken generally along the line 6—6 of Figure 5, showing the manner of connecting the biasing spring to the land measurer case for the form of the invention shown in Figure 5.

Referring now to the drawings, particularly Figures 1 and 2, the reference numeral 1 indicates a grain drill which includes a hopper or seed box 2 having side walls 3 and a bottom wall 4 suitably connected together by means that also secures a reenforcing strap 5 to the sheets 3 and 4. Disposed along the bottom sheet or wall 4 is a plurality of seed dispensing units 7 driven by a seeding shaft 8. The latter is driven in any suitable manner and the seeding units 7 are largely conventional, so far as the present invention is concerned, and hence further description of them is unnecessary. It will be sufficient at this point to note that the seeding shaft 8 is driven proportional to the travel of the grain drill 1 and therefore a device which measures the number of rotations of the seeding shaft 8 may be used as means for indicating the total acreage covered by the machine.

The land measurer device, with which the present invention is more particularly concerned, is indicated in its entirely by the reference numeral 10. The device 10 comprises a casing 11 formed with a back wall 12, and peripheral walls 13, the forward open portion of which is closed by a cover 14. Extending forwardly or outwardly from the bottom wall 12 is a plurality, preferably three, of studs, indicated by the reference numerals 17, 18 and 19, respectively, the stud 19 being in the lower portion of the casing 11 while the other two studs 17 and 18 are in the upper portion. Preferably, although not necessarily, the studs 17 and 19 are substantially the same size while the stud 18 is somewhat larger than the stud 17. The reason for this particular arrangement will be clear from the detailed description below. The casing 11 is formed with a rear socket or extended portion 22, and this portion of the casing, together with the adjacent portions of the flange walls 13, are shaped to provide a downwardly and outwardly extending neck or sleeve section 23. The section 23 is apertured, as at 25, to receive a driving member 26 in the form of a gear 27 and an extended shank section 28 having a polygonal inner end 29 adapted to seat in a complementarily formed socket 31 fixed to or carried by a counter driving gear 33. The shank 28 is apertured to receive a bolt 35 which serves to hold the two members 26 and 33 together, and the gear section 27 of the member 26 is formed and positioned to mesh with a driving worm gear 37 that is rotated by the seeding shaft 8.

The casing 11 is supported from the seed box 2 and yieldably held in driving relation with respect to the worm gear 37 by means that will now be described. At the upper end of the casing 11, the back wall 12 thereof is provided with a pair of lugs 41 and 42 (see Figure 6), adjacent each of which is an abutment lug 43. As best shown in Figure 1, these lugs are adapted to engage the hopper side wall 3. The latter is provided with a pair of apertures 45 (Figure 1) to receive the lugs 41 and 42, and the casing 11 is held in place by a pair of washers 46 and cotter keys 47 passed through openings 48 (Figure 6) in the lugs 41 and 42. The rear side of the back wall 12 is formed with a pair of parallel ribs 51 (Figure 6) and, in the form of the invention shown in Figure 1, a spring member 54 is fixed, as by a rivet 55 or the like (Figure 2) to the casing 11 with its lower end disposed between the two ribs 51. The upper end of the spring 54, as indicated at 56, bears against the side wall 3 of the hopper and exerts sufficient bias to hold the gear 27 in mesh with the driving worm gear 37.

As best shown in Figures 1 and 2, the gear member 33, which is driven by the planter mechanism, is in the form of a spiral, indicated at 61, which meshes with the teeth 62 formed on a gear 63. The central part of the latter is formed with a polygonal opening, preferably square, as indicated at 64, which receives a squared reduced portion 65 formed on the hub 66 of a first counter gear 67 which is loosely mounted on the stud 19. A driving tooth 68 (Figure 2) is formed on or carried by the gear 67.

The stud 18 is disposed immediately above the stud 19 and carries a second counter gear 71 which is provided with a flat face or flange 72 and a plurality of teeth 73. Additionally, the gear 71 carries a single driving tooth 74 which extends radially outwardly of the flange or face 72 in a position to engage teeth 77 formed on or carried by a third counter gear 78 which is mounted for rotation on the adjacent stud 17. The tooth 68 is adapted to engage one of the teeth 73 so that one revolution of the counter gear 67 advances the second counter gear 71 one tooth, and similarly one revolution of the second counter gear 71 causes the tooth 74 to advance the third counter gear 78 one tooth. Each of the second and third counter gears 71 and 78 is provided with ten teeth. As shown in Figure 2, the outer face of each of the counter gears 67, 71 and 78 carries indicia in the form of numbers running from "0" to "9." A spring 79 is fixed to the casing wall 13 by a rivet 81 or the like and has a first end 82 shaped to engage between adjacent teeth 73 on the gear 71, thus establishing a bias tending to hold the gear 71 in a position with one of the numbers thereon adjacent a number on the third counter gear 78. The spring 79 is also provided with a curved end 83 engaging in between adjacent teeth 77 on the member 78 for likewise holding the gear against rotation unless actually and positively displaced. The gear 67 is, of course, continuously driven by the spiral driving member 33, and as best shown in Figure 1, the latter is driven continuously from the seeding shaft 8. It will be understood that when the furrow openers are raised suitable mechanism (not shown) disconnects the seeding drive so that the rotation of the seed shaft 8, and the actuation of the land measurer 10, is terminated.

The front of the casing 11 is closed by the cover 14 which, as best shown in Figures 3 and 4, comprises a flat plate section 91 having a pair of windows or sight openings 92 and 93. The latter opening is so located that the numbers 94 on the face of the first counter gear 67 are visible through the opening 93. The other sight opening 92 in the cover plate 91 is elongated and is disposed on the cover so that the two contiguous numbers on the counter gears 71 and 78 are visible therethrough. The gears 26 and 37 are preferably so chosen that, according to the width of the grain drill, the numbers 94, visible through the opening 93 in the cover 14, indicate tenths of an acre while the two numbers on the gears 71 and 78 are visible through the cover opening 92, indicate whole numbers of acres, extending from 0 to 99.

The cover 14 is of particular construction. As best shown in Figure 4, the cover 14 on its inside plate is provided with a locating rib or flange 95 which interfits with the edges of the flange or wall 13 of the casing 11. Additionally, the inner face of the cover 14 is provided with three annular ribs 96, 97 and 98 which, as best shown in Figure 1, encircle the ends of the studs 17, 18 and 19, respectively, cooperating with the three counter gears 67, 71 and 78 to hold them in position in the casing 11. No other fastening means for the various gears is required. The cover 14 is provided with an aperture 101 (Figure 3) to receive a bolt 102 which extends upwardly from the back wall 12 of the casing and carries a wing nut 103 which, when tightened, serves to hold the cover 14 in position.

The assembly of the unit 10 may be accomplished easily and quickly, since all that it is necessary to do, after the spiral gear 33 and the driving gear 26 are connected together by the bolt 35, is to drop the gears 63 and 66 over the stud 19, and the gears 71 and 78 over the studs 18 and 17, after which the cover 14 may be bolted in place and the unit assembled. Due to the fact that the stud 18 is larger than the stud 17, there is no possibility of a careless assembler interchanging the gears 71 and 78, and there is no likelihood of inadvertent exchange of the other gear members since the two members 63 and 66 are quite unlike the other gears 71 and 78 and, moreover, interfit one with the other, as indicated at 64 and 65, during their assembly onto the stud 19.

In the grain drill 1, as described above, the seeding shaft 8 is driven only when the furrow opening tools of the grain drill are lowered and in operation; when they are raised the drive to the shaft 8 is interrupted by suitable clutch means (not shown). However, the present land measurer is equally adaptable for installation on a grain drill of the type in which provision may be made for driving the land measurer from a constantly driven jackshaft that is geared to the supporting wheels and in which the seeding shaft is so located as to make it inconvenient to connect the land measurer drive thereto but in which it is convenient to drive the land measurer from the ground wheel driven jackshaft. However, in such instances, it is desirable to provide means for connecting and disconnecting the drive between the land measurer and the jackshaft.

Referring now to Figures 5 et seq., the grain drill of the latter mentioned type is indicated by the reference numeral 110 and includes a hopper or seed box 111 mounted on a grain drill frame 112 by suitable bracket means 113. The hopper 111 is substantially the same as the hopper 1 described above, embodying a bottom wall 116, end walls 117 and side walls 118, the latter having a pair of openings 119 to receive the anchoring lugs 41 of the land measurer unit 10 which is substantially the same as described in detail above. The grain drill 110 is provided with a jackshaft 121 supported by suitable journals in the end brackets 113 and/or other parts, and other brackets 122 fixed to the frame 112 support a rockshaft 123 which is actuated by suitable means (not shown) for raising and lowering the furrow openers on the drill.

In this form of the invention, the same land measurer unit 10 is employed as shown in Figures 1-4 and described above, including a casing 11 enclosing the counter indicating gears, a cover 14, and a drive gear 26 for driving the counter gears in the casing 11. In this arrangement the counter actuating gear 26 is adapted to mesh with a driving worm gear 124 that is mounted on and driven by the jackshaft 121. A spring 125, curved as shown in Figure 5, is fastened between the locating ribs 51 (Figure 6) but, instead of extending upwardly as the spring 54 extends in Figure 1, the spring 125 extends downwardly and inwardly so that the inner end 126 of the spring bears against the bottom sheet 116 on the hopper, continually urging the gear 26 into meshing engagement with the jackshaft drive gear 124.

For interrupting the land measurer drive whenever the furrow openers are raised, an actuating cam 131 is clamped, as by a U-bolt 132, to the rockshaft 123 and is adapted to bear against the forwardly extending angle bracket member 134 secured, as by a bolt 135, to the cover 14. For properly locating the bracket 134, the cover 14 is provided with a rib 136. Whenever the rockshaft 123 is actuated to raise the furrow openers, the curved portion of the cam member 131 comes into engagement with the end 137 of the bracket 134, forcing the land measurer unit 10 inwardly so as to disengage the gear 26 from the gear 124, the spring 125 yielding to accommodate this action. The disengaged position of the land measurer 10 is indicated in dotted lines in Figure 5. As best shown in Figure 3, the cover 14 is provided with an opening 138 to receive the bolt 135, the opening 138 being disposed immediately below the locating rib 136. For convenience in manufacture, the cover and back wall of all of the casings 11 are provided with the locating ribs 51 and 136 so that any land measurer units may be provided for either type of installation.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a grain drill having a hopper, a rockshaft, and a driven member adjacent said rockshaft, a land measurer comprising a counter unit, means pivotally mounting said counter unit on the hopper of said grain drill in a position such that one portion of said unit swings toward and away from said driven member and said rockshaft, driving means carried by said unit in a position to engage said grain drill driven member, means acting between said unit and said hopper for releasably holding said counter driving member in driving engagement with said grain drill driven member, a part attachable to said rockshaft to rock therewith, and means on said unit positioned to be engaged and moved by said part, when said rockshaft is rocked, to disengage said driving means from said grain drill driven member.

2. In a grain drill having a rockshaft, a hopper, and seeding mechanism including a rotatable shaft for actuating said mechanism, a land measurer comprising a counter unit having a casing, means at one end of said casing for swingably mounting said casing on the hopper, counter driving means including a gear member at the other end of said casing adapted to be releasably connected with said grain drill shaft, spring means carried by said casing and acting against the hopper for yieldably urging said counter driving means into driving connection with said grain drill shaft, and means attachable to said rockshaft to be actuated thereby and connected with said casing for disengaging said counter driving means from said grain drill shaft so as to interrupt the actuation of said counter unit when said rockshaft is rocked.

3. In a land measurer adapted to be detachably connected with a supporting part, a casing, counter mechanism carried thereby, means for detachably mounting said casing on said part, one wall of said casing having one or more locating ribs, and a biasing spring member fixed to said casing in engagement with and located by said rib and detachable from said part with said casing.

4. In a grain drill including a hopper having one wall formed with a pair of openings therein, the improvement which includes a land measurer unit comprising a casing having a pair of lugs carried thereby and adapted to extend loosely through said openings in the grain drill hopper so as to be pivotally carried thereby, and means engageable with said lugs on the inside of said hopper for holding said land measurer in position thereon while accommodating pivotal movement of the casing relative to the hopper.

5. The invention set forth in claim 4, further characterized by auxiliary abutment lugs also carried by said land measurer and shaped to engage the outer face of said grain drill hopper adjacent said openings and accommodate pivotal movement of the casing relative to said hopper, said auxiliary lugs cooperating with said first mentioned lugs for locating the land measurer in position on the grain drill hopper.

6. In a land measurer, a casing, counter mechanism carried thereby, means for swingably mounting said casing on a grain drill or the like, one wall of said casing having a pair of parallel spaced apart spring-receiving locating ribs, the latter being adapted to receive a spring extending either in one direction or the other relative to said casing.

7. For use in a grain drill having a hopper and seeding mechanism including a rotatable shaft for actuating said mechanism, a land measurer comprising a counter unit having a casing, one or more lugs projecting from the casing, said hopper having one or more openings to swingably receive said lugs, means on the inside of the hopper engageable with said lugs for holding said casing on the hopper, counter driving means including a gear member adapted to be releasably engaged with said rotatable shaft, one wall of said casing having a pair of spaced-apart locating ribs disposed in transverse alignment with said lugs, and a spring member fixed to said casing between and located by said ribs, said spring member being detachable from said hopper with said casing.

WILLIAM A. HYLAND.
ROYCE R. BORNGRAEBER.

REFERENCES CITED

The following references are of record in the file of this patent:

UNITED STATES PATENTS

| Number | Name | Date |
|---|---|---|
| 295,768 | Jones | Mar. 25, 1889 |
| 481,608 | Weston | Aug. 10, 1892 |
| 489,078 | Hart | Jan. 3, 1893 |
| 518,083 | Weber | Apr. 10, 1894 |
| 613,187 | Boyd | Oct. 25, 1898 |
| 627,381 | Bills | June 20, 1899 |
| 904,084 | Phillippe | Nov. 17, 1908 |
| 1,162,388 | Ocumpaugh | Nov. 30, 1915 |
| 1,179,069 | Brush | Apr. 11, 1916 |
| 1,300,329 | Berg | Apr. 15, 1919 |
| 1,671,553 | Sheldrick | May 29, 1928 |

FOREIGN PATENTS

| Number | Country | Date |
|---|---|---|
| 489,514 | Great Britain | July 28, 1938 |
| 257,845 | Germany | Mar. 22, 1913 |